United States Patent [19]

Okuzawa

[11] 4,011,571
[45] Mar. 8, 1977

[54] VIEW FINDER FOR CAMERAS
[75] Inventor: Yasutoshi Okuzawa, Tokyo, Japan
[73] Assignee: Fuji Photo Film Co., Ltd., Kanagawa
[22] Filed: Mar. 17, 1972
[21] Appl. No.: 235,696
[30] Foreign Application Priority Data
Mar. 18, 1971 Japan .................. 46-18470[U]
[52] U.S. Cl. ........................... 354/219; 354/198; 354/289
[51] Int. Cl.² ................................. G03B 13/02
[58] Field of Search ............ 95/11 V, 44 R, 44 C; 354/198–200, 219, 289

[56] References Cited
UNITED STATES PATENTS

| 2,187,246 | 1/1940 | Nerwin | 354/219 |
| 3,727,530 | 4/1973 | Aoki | 354/199 X |

FOREIGN PATENTS OR APPLICATIONS

| 1,259,871 | 3/1961 | France | 95/44 |
| 31,150 | 5/1964 | Germany | 354/219 |
| 875,978 | 8/1961 | United Kingdom | 354/219 |

Primary Examiner—John Gonzales
Attorney, Agent, or Firm—Sughrue, Rothwell, Mion, Zinn & Macpeak

[57] ABSTRACT

In a view finder for cameras comprising a sight field for viewing an object to be photographed, the improvement which comprises mark means in said sight field for guiding on the centering of said object to be photographed and on the proper photographing distance from said object to be photographed is disclosed.

8 Claims, 13 Drawing Figures

FIG. 1 PRIOR ART
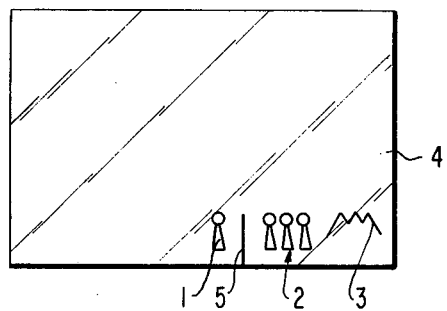
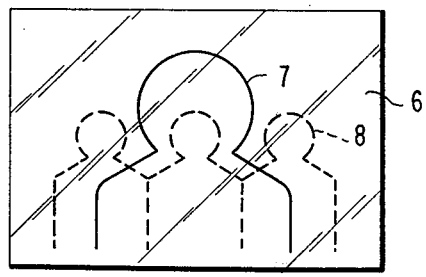
FIG. 2A
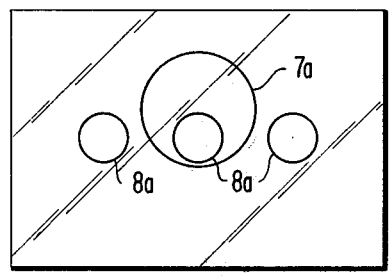
FIG. 2B
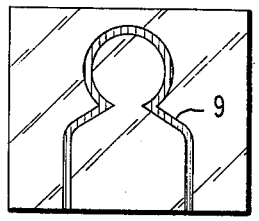
FIG. 3A
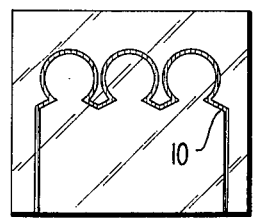
FIG. 3B
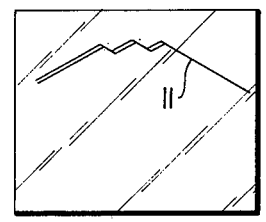
FIG. 3C

FIG. 4
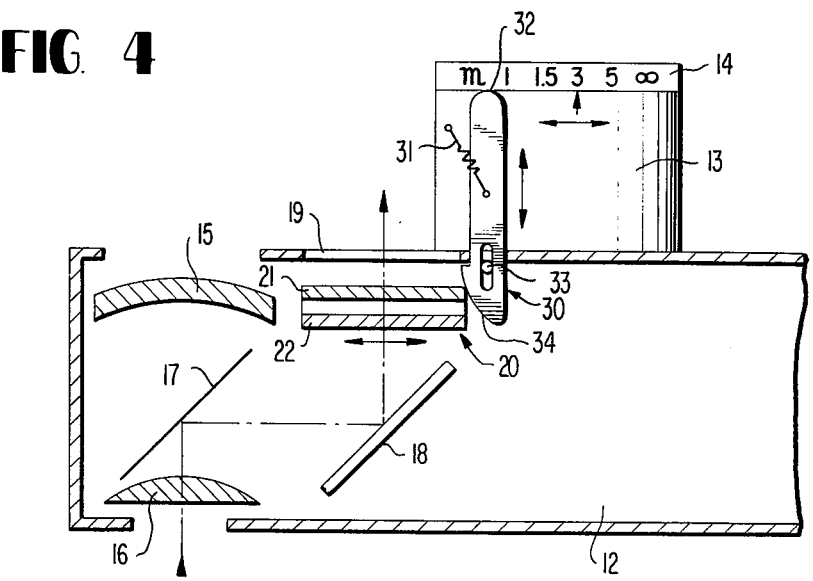
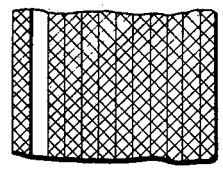
FIG. 5A
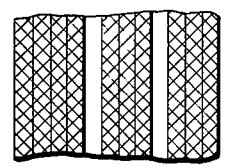
FIG. 5B
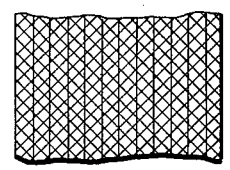
FIG. 5C
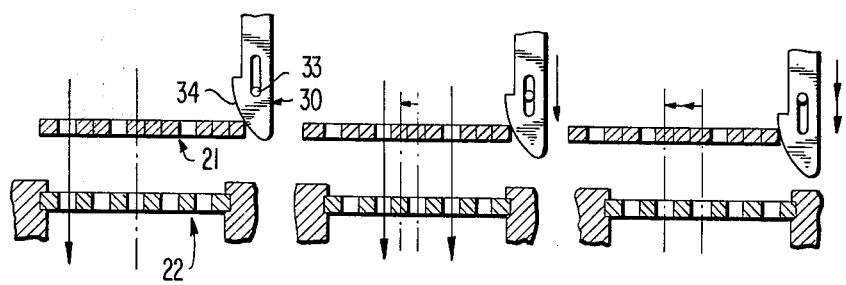
FIG. 6A  FIG. 6B  FIG. 6C

VIEW FINDER FOR CAMERAS

BACKGROUND OF THE INVENTION

1. Field of the Invention

This invention relates to a view finder adapted to be mounted in a camera for amateur use. More particularly this invention relates to a view finder for cameras having means for instructing good composition of pictures to be taken.

2. Description of the Prior Art

Generally, beginners in photography are apt to take pictures from a distance too far from the object. Accordingly, pictures taken by beginners are likely to have a small image of the object and to be unattractive. The distance from the object when taking pictures, particularly in case of taking portraits, is a very important factor and accordingly mentioned in most guide books and in instructions. This is, however, actually difficult to carry out and in practice most beginners forget this rule.

In view of the above described difficulty in photography, a primary object of the present invention is to provide a view finder for cameras incorporating means for instructing on this point. In other words, a first object of the present invention is to provide a view finder for cameras in which the desirable size of the object seen from the view finder is shown.

Further, it is known in the art to provide a distance indication means in the sight field of the view finder for roughly indicating the distance from the object. FIG. 1 is a frontview of the view finder sight field of one example of the above described prior art type of view finder in which a distance indication means is provided. Such a camera is called a "zone focus" type of camera. In such a camera, a shown in FIG. 1, the distance is indicated by a designation such as a mark showing one person 1 for indication of a proper distance for taking a portrait of one person (about 1m), a mark showing a few persons 2 for indication of a proper distance for taking a picture of a few people (about 3m), and a mark of a mountain 3 for indication of infinity. Such marks 1, 2 and 3 are printed on a glass in the sight view 4 of the view finder and a needle 5 is moved in the view finder in association with a distance ring on the camera.

In such a camera of the zone focus type, beginners are also apt to take pictures from a too far distance. Therefore, the pictures taken tend not only to be unattractive with small images, but also are apt to have images which are of out of focus. This is because beginners are apt to take pictures from a distance farther from the object than the properly predetermined distance, such as one meter, or 3 meters as mentioned above.

In the present invention, such mistakes in the distance from which the pictures are taken are considered and the size of the object to be taken when seen through the view finder is indicated in the view finder to show the optimum distance for taking pictures.

In other words, a second object of the present invention is to provide a view finder for cameras in which the proper distance for taking pictures is indicated using the size of the object as seen through the view finder so that the image may be properly focussed on the film.

Another object of the present invention is to provide a view finder for cameras by which the photographer can take pictures automatically without measuring the distance with the eye or with a scale.

Still another object of the present invention is to provide a view finder for cameras in which marks indicating the size and the position of the object and for making focal adjustments appear clearly in the sight field of the view finder.

A further object of the present invention is to provide a view finder for cameras in which marks for indicating different distances of objects appear and disappear in response to the variation in focal length of the taking lens.

These and other objects will be made apparent from the following description of embodiments of the present invention.

SUMMARY OF THE INVENTION

The above objects are accomplished by providing marks in the view finder sight field indicating the size, position and kind of objects seen through the view finder. Further, some of the above objects are accomplished by interconnecting the indication of the marks with the distance ring of the camera.

Other features and advantages of the present invention will be made explicit from the following detailed description of the preferred embodiments of the present invention taken in conjunction with the accompanying drawings.

BRIEF DESCRIPTION OF THE ACCOMPANYING DRAWINGS

FIG. 1 shows the sight field of a view finder in accordance with the prior art.

FIG. 2A is a front view of an embodiment of the sight field of a view finder in accordance with the present invention.

FIG. 2B is a front view of another embodiment of the sight field of a view finder in accordance with the present invention.

FIGS. 3A, 3B and 3C are front views of still another, a third, embodiment of a view finder in accordance with the present invention in which the mark changes according to the variation in focal length of the taking lens.

FIG. 4 is a schematic horizontal sectional view showing a construction of the interconnection mechanism employed in the third embodiment of the view finder as shown in FIGS. 3A, 3B and 3C, FIGS. 5A, 5B and 5C are enlarged front views showing the variation in mosaic patterns employed in the third embodiment, and FIGS. 6A, 6B and 6C are enlarged partial sectional views showing a mechanism employed in the third embodiment of the present invention for causing the mosaic pattern to change.

DESCRIPTION OF THE PREFERRED EMBODIMENTS

Now referring to FIG. 2A showing an embodiment of the invention, a sight field 6 of a view finder is provided with a mark 7 for indicating the size and position of a one person portrait and a mark 8 for indicating the size and position of a three person photograph. The mark 7 is printed as a solid line and the mark 8 is printed as a broken line on a glass positioned in the view finder optical system. When taking pictures, the photographer adjusts the image of objects with the mark 7 or 8 so that the photograph may have proper size of the image.

An embodiment shown in FIG. 2B is a modification of the first embodiment shown in FIG. 2A. In this second embodiment, the marks are simplified to only indicate the size and position of the head or heads of the person or persons to be photographed. The single circle 7a is a mark for indicating the size and position of the head in taking a portrait, and the three circles 8a indicate proper position and size of the heads of three people to be photographed.

In a third embodiment, shown in FIGS. 3A, 3B and 3C, the mark in the view finder changes according to the distance. In other words, when the distance ring is so adjusted as to make the taking lens focus on an image at a distance of one meter, a mark 9 indicating the proper size and position for a portrait at a distance of one meter appears in the view finder. When the distance ring is so adjusted as to make the taking lens focus on an image of three persons at a distance of 3 meters, a mark 10 indicating the proper size and position for a picture of three persons at a distance of three meters appears in the view finder and said mark 9 disappears from the finder. Similarly, when the distance ring is set to infinity, a mark 11 in the shape resembling a mountain appears in the view finder. Only the mark 11 can be omitted, because the necessity for providing the infinity mark is not as great since the difficulty in taking pictures of objects at an infinite distance is not as great.

In order to make the view finder having such an indication means as described above and as shown in FIGS. 3A, 3B and 3C, various mechanical constructions can be adopted using prior art mechanical devices.

An example of such a mechanism for effecting the view finder as described above in the third embodiment is shown in FIG. 4. Now referring to FIG. 4, a camera body 12 is provided with a lens barrel 13 fixed thereto and a distance ring 14 is rotatably mounted to the lens barrel 13. A view finder portion consists of an objective lens 15, an eye piece 16, a partial reflection mirror 17, a total reflection mirror 18 and a light transmitting window 19, of which elements a bright frame type view finder is composed. Just inside the light transmitting window 19 a bright image mechanism 20 constituting the main portion of the present invention is located. This bright image mechanism 20 is associated with a distance ring 14 by way of a cam lever 30. The cam lever 30 is guided by a guide pin 33 fixed to a portion of the camera body 12 and urged to abut the distance ring 14 by means of a tension spring 31 at one end thereof. The other end of the cam lever 30 is provided with a cam face 34 to be in engagement with a part of the bright frame mechanism. The end of the cam lever 30 for abutting the distance ring 14 may abut a portion of a member fixed to or connected with said distance ring 14 which is moved in a direction to move the cam lever lengthwise as the ring 14 rotates.

The bright image mechanism 20 is composed of a movable mosaic plate 21 having a pattern of mosaic including the marks 9, 10 and 11 representing the mosaic image of the marks, and a stationary slit plate 22 located in parallel to the mosaic plate 21. The mosaic plate 21 is movable in a direction pependicular to the lengthwise direction of the slits provided in the slit plate 22. In this embodiment shown in FIGS. 5A to 5C and 6A to 6C, the mark 11 is omitted. By moving the mosaic plate 21 relative to the slit plate 22, the image seen when viewing the plates from a perpendicular direction to the surface of the plates is changed as shown in FIGS. 5A to 5C. FIG. 5A shows an enlarged part of the mark 9 shown in FIG. 3A, and FIG. 5B shows an enlarged part of the mark 10 shown in FIG. 3B. In the condition shown in FIG. 5C, no image is seen. The relative position of the mosaic plate 21 to the slit plate 22 is clearly shown in FIGS. 6A to 6C in correspondence to FIGS. 5A to 5C. The solid line with an arrow in FIGS. 6A and 6B indicates the light transmitted through the mosaic plate 21 and the slit plate 22.

It will be readily understood that the mark 11 as of a mountain pattern omitted in the embodiment shown in FIGS. 5A to 5C may be made to appear in the finder. Further, it will be understood that the kinds of the marks, three of which are described in the above embodiments, may be greater than three.

Moreover, it will be understood that the mosaic plate may be substituted for by other kind of transparent disc or plate bearing several marks. Actually, various image changing means can be employed for changing the marks in the view finder.

While the invention has been described in terms of various embodiments, it will be apparent to one skilled in the art that various changes and modifications can be made therein without departing from the spirit and scope thereof.

What is claimed is:

1. In a view finder for a camera comprising a sight field for viewing an object to be photographed, the improvement comprising:
    means for positioning within said sight field a plurality of mark means of a different size, position and configuration corresponding to, the size, position, and configuration of the objects being photographed when said objects are properly centered and positioned with respect to the camera lens system as seen through said view finder;
    whereby, centering of a given object to be photographed and moving the camera relative to the object such that the object within the sight field corresponds in size, position and configuration to a corresponding mark means insures a proper position of the object relative to the camera and at a proper distance therefrom.

2. The view finder as claimed in claim 1, wherein said mark means comprises a first mark means for centering and positioning a single object to be photographed at close range and a second mark means for centering and positioning a group of objects to be photographed at an intermediate range with respect to the camera.

3. A view finder as claimed in claim 2, wherein said first mark means and said second mark means comprise visible images on a transparent member positioned within the sight field of the view finder.

4. A view finder as claimed in claim 2 for a camera including a distance ring, further comprising means for making a selected one of said mark means visible only when the distance ring setting is appropriate for taking the picture of the object or objects corresponding to said selected mark means.

5. A view finder as claimed in claim 4, wherein said mark defining means comprises a bright frame mechanism operatively associated with said distance ring.

6. A view finder as claimed in claim 5, wherein a cam member operatively couples said bright frame mechanism with said distance ring, and said bright frame mechanism comprises a movable image forming member following said cam member.

7. A view finder as claimed in claim 6, wherein said bright frame mechanism comprises a slit plate and a movable mosaic plate positioned for movement in parallel with said slit plate and overlying the same with said movable mosaic plate in engagement with said cam member.

8. A view finder as claimed in claim 2, wherein said second mark means comprises three substantially circular marks arranged in a horizontal alignment and said first mark means comprises a larger substantially circular mark centrally positioned with respect to said second mark means so as to overlie the center of said three substantially circular marks in vertically raised eccentric position with respect to the center circular mark of said second mark means.

* * * * *